June 2, 1970   E. E. PAULSON ET AL   3,514,955
MIXING STRUCTURES AND TURBOFAN ENGINES EMPLOYING SAME
Filed March 28, 1968                                3 Sheets-Sheet 1
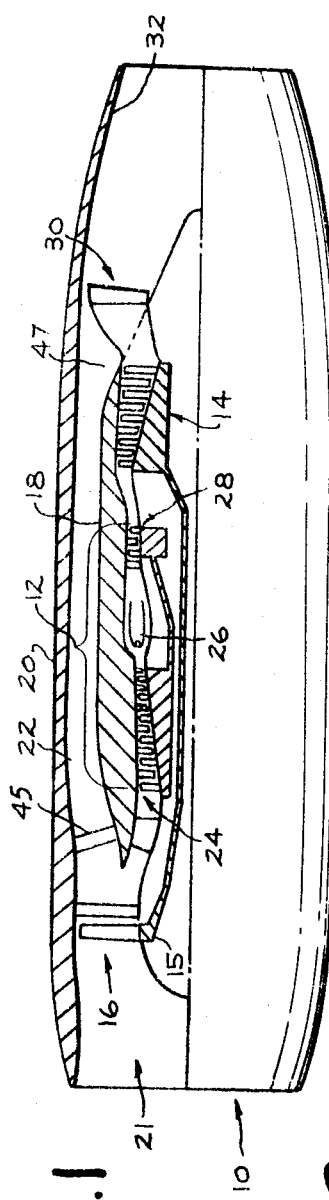
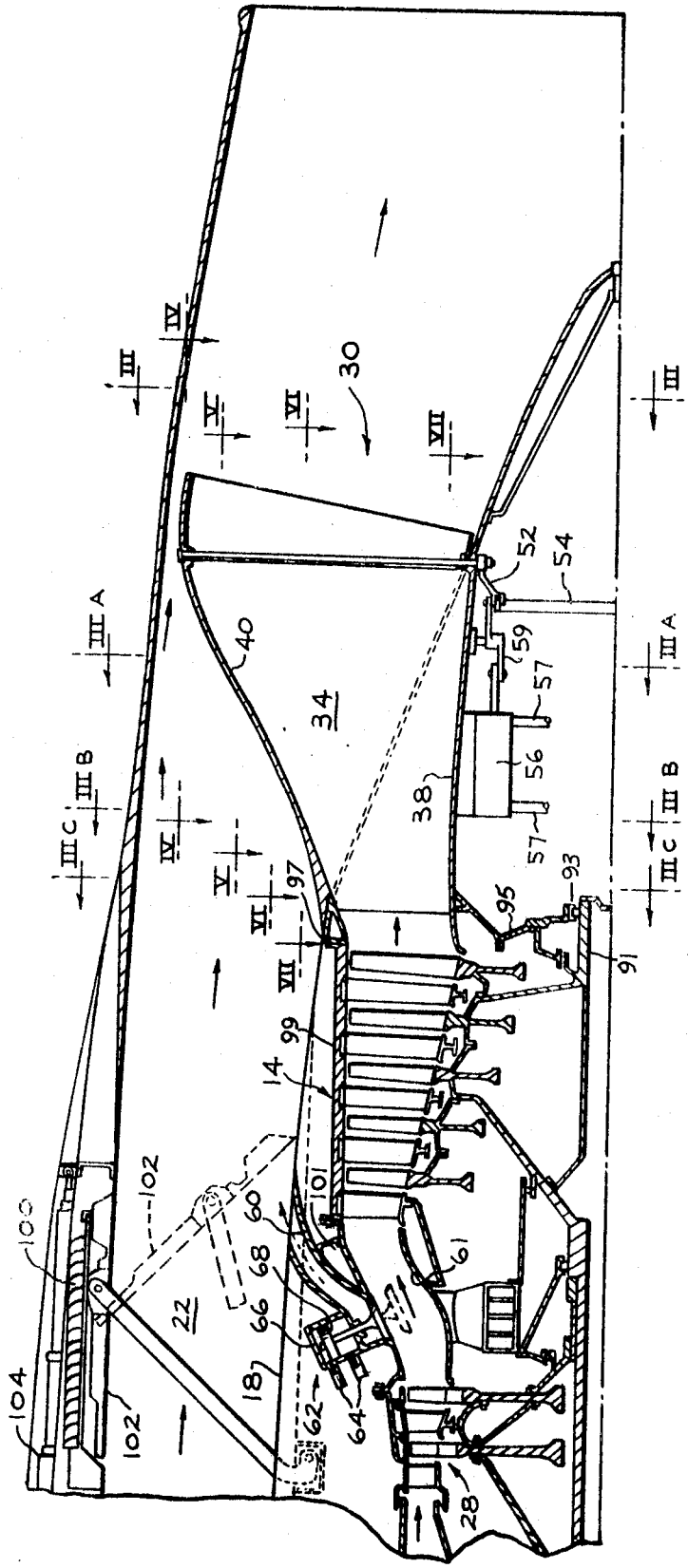

INVENTORS
ELMIR E. PAULSON
DANIEL M. JUDGE

ATTORNEY

United States Patent Office 3,514,955
Patented June 2, 1970

3,514,955
MIXING STRUCTURES AND TURBOFAN ENGINES EMPLOYING SAME
Elmir E. Paulson, Topsfield, and Daniel M. Judge, Saugus, Mass., assignors to General Electric Company, a corporation of New York
Filed Mar. 28, 1968, Ser. No. 716,942
Int. Cl. F02k 3/04; B01f 5/00
U.S. Cl. 60—262      7 Claims

ABSTRACT OF THE DISCLOSURE

A turbofan engine in which the hot gas stream of its core engine is mixed by a lobed mixer with the pressurized fan stream. The mixed streams are discharged from a common propulsive nozzle. The mixer is a lightweight construction, formed by side walls radially of the axis of a duct through which the fan stream passes. The lobe side walls, which define the hot gas stream passageways, have a decreasing included angle from the hot gas stream inlets to outlets. A flapper valve forms one side wall of each lobe, and means are provided for swinging the flapper valve to reduce the hot gas stream discharge area therethrough to reduce fan speed and the noise generated by the fan.

---

The present invention relates to improvements in structures for moving gas streams and, more particularly, to turbofan engines employing such mixing structures.

Turbofan engines are generally characterized by a core engine which generates a hot gas stream. The core engine drive a fan which pressurizes an air stream in a duct, generally concentric of the core engine. Advantageously these two streams may be mixed and then discharged through a nozzle to provide a propulsive force.

The radio of the mass of air flowing through the fan duct to the mass of air passing through the core engine is referred to as the bypass ratio. Recent developments have demonstrated that for a given engine weight, increased propulsive force and reduced fuel consumption can be obtained from turbofan engines having a relatively high bypass ratio—for example, 5/1 or higher.

In order to obtain such high bypass ratios, the diameter of the fan blades has become quite large and tip speeds of the blades quite high, in fact, supersonic. Such large diameters and high speeeds resulted in the fan becoming the predominant source of objectionable noise in the propulsion of an aircraft. This is opposed to earlier turbojet and low bypass ratio turbofans where the predominant noise source resulted from the discharge of the hot gas stream from its propulsive nozzle.

The present invention is related to an invention disclosed and claimed in a copending application entitled "Turbofan Engines," Ser. No. 716,943, filed simultaneously with the present application in the name of Robert E. Neitzel, both applications being of common assignment. In the referenced application a turbofan engine of the so-called mixed flow type is disclosed, wherein the hot gas stream and fan stream are mixed prior to discharge through a common nozzle. In order to reduce fan noise and overall engine noise when operating under conditions of reduced power, it is proposed in accordance with the invention of that application that the discharge area of the hot gas stream mixer passageways be reduced in order to lower fan speed and thereby obtain a substantial reduction in fan noise as well as a substantial reduction in overall engine noise.

In order that the invention of said application achieve its full potential, it is essential that the mixer structure and the means for reducing the discharge area of the hot gas stream from the mixer structure be efficient, simple, light in weight, and reliable in operation. It is further desirable that increases in engine weight and length be minimized. This is to say that while noise reduction is a very important goal, it is equally important that it be attained with a minimum effect on the operating efficiency of the engines and the aircraft propulsed thereby. Hence, efficient mixing of the fan stream and the hot gas stream, i.e., minimization of energy losses, and minimum weight penalties, as well as maximum reliability, become of particular significance.

Accordingly, one object of the present invention is to provide an efficient, lightweight mixer structure, particularly adapted for mixing the hot gas stream and fan stream of a turbofan engine for discharge through a common nozzle and, in a related and broader sense, to attain these same ends in mixing any two gas streams.

Another object of the invention is to provide a simple and reliable means for efficiently varying the discharge area of the hot gas stream from the mixer in order to provide for a reduction in fan speed and reduced engine noise.

Another ibject is to minimize the overall length and weight of a turbofan engine employing a mixer for the fan stream and hot gas stream.

These ends are attained by a mixer structure, preferably embodied in a turbofan engine, having an annular duct through which the pressurized air stream passes downstream of the core engine. The mixer structure comprises a plurality of lobes which project from the hot gas stream into the fan stream. The lobes have side walls formed generally radially of the axis of the annular fan duct and define alternate chutes, through which the hot gas stream and fan stream pass. These side walls have a progressively decreasing included angle from inlets to the outlets of the hot gas stream chutes. The outer walls of the lobes are smoothly curved toward the outer duct wall. The upstream portions of the lobes projecting into the duct are faired. The duct walls simultaneously form the fan stream passageways, as well as the hot gas stream passageways, with a minimum of structural elements.

In order to obtain a variation in the hot gas stream passageway exit areas, flapper valves respectively form one of the downstream end portions of each lobe radial wall. Preferably these flapper valves are mounted on pins that extend radially inwardly. Levers attached to the inner ends of the pins are connected to a unison ring which in turn may be oscillated by an actuator to thus swing the flapper valves and obtain the desired variations in hot gas stream passageway outlet area.

Turboengines commonly employ a fan turbine which is driven by the hot gas stream. Overall engine length and weight are minimized by employing the mixer to carry bearing loads from the rear fan turbine bearing to the primary frame structures of the engine.

The above and other related objects and features of the invention will be apparent from a reading of the following description of the disclosure formed in the accompanying drawings and the novelty thereof pointed out in the appended claims.

In the drawings:

FIG. 1 is a view, on a greatly reduced scale and partially in simplified, longitudinal section, of a turbofan engine embodying the present invention;

FIG. 2 is a longitudinal section, on an enlarged scale, of the nozzle end portion of the engine;

Figure 3:
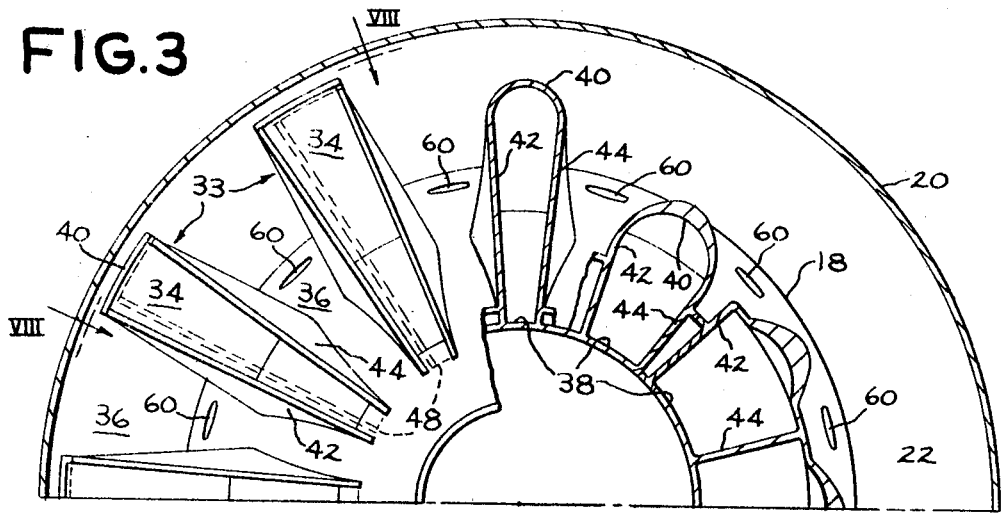
FIG. 3 is a section taken progressively on lines III—III, III—IIIA, III—IIIB, and III—IIIC in FIG. 2.
Figure 4:
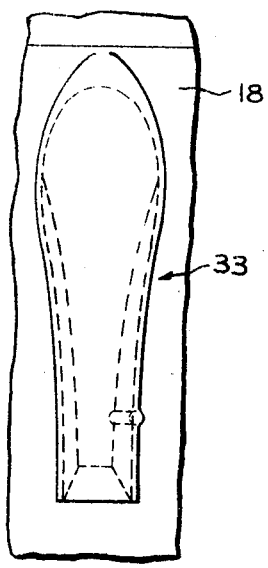
FIG. 4 is a view taken on line IV—IV in FIG. 2.

The turbofan engine seen in FIG. 1 comprises a core engine 12 which generates a hot gas stream for driving a fan turbine 14. The turbine 14 is connected to and drives the rotor 15 of a fan 16 disposed at the inlet end of the engine. The core engine 12 and the fan turbine 14 are housed within a nacelle or inner casing 18. An elongated cowl or outer casing 20 defines the engine inlet indicated at 21 and, in combination with the nacelle 18, defines an annular duct 22, concentric of the core engine 12.

In operation, the fan 16 pressurizes an air stream, the outer portion of which passes along the duct 22 and the inner portion of which enters the core engine 12. In the core engine the air stream is further compressed by core engine compressor 24 to provide a highly pressurized air stream for supporting combustion of fuel in a combustor 26. The hot gas stream thus generated drives a high pressure core engine turbine 28 which is connected to the rotor of the compressor 24. The hot gas stream passes through an outwardly curved annular duct 61 to the fan turbine 14. The fan stream and the hot gas stream pass through a mixer 30 and then are discharged from a nozzle 32 to provide thrust for propulsion of an aircraft.

Figure 8:
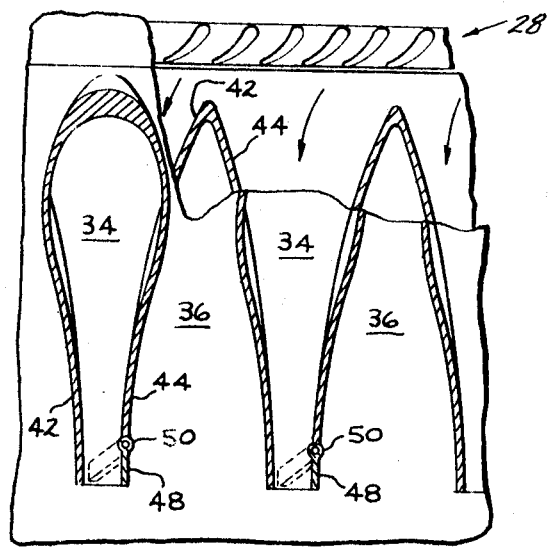
FIG. 8 is a development, with portions broken away, taken on line VIII—VIII in FIG. 3.

Reference is next made to FIGS. 2, 3, and 8 for a more detailed description of the mixer 30. The mixer 30 comprises a plurality of lobes 33 which project into the fan stream duct 22. The lobes form alternating chutes 34, 36 through which the hot gas stream and the fan stream respectively pass, to be mixed downstream of the lobes 33. The hot gas stream flow path through the chutes 34 is defined by an inner wall 38, an outer wall 40, and side walls 42, 44, of the lobes 33. The upstream ends adjacent walls 42, 44 are joined to divide the hot gas stream flow from the turbine 14 as it enters the chutes 34. The fan stream chutes 36 are defined by the outer cowl 20, the nacelle 18, as it continues between the lobes 33, and by the outer wall 40 and side walls 42, 44 of these lobes. The outer walls 40 of the lobes 33 are spaced from the inner surface of cowl 20 so that there is a continuous flow of relatively cool air along the inner surface of the cowl to avoid hot streaks on the inner surface of the cowl in the mixing zone, downstream of the discharge plane of the mixer.

In order that there will be a minimum of losses as the fan stream and hot gas stream pass through the mixer and are effectively mixed in a relatively short axial length, the outlet openings of the hot gas chutes 34 are configured so that the mass flow rates at any radial point in the discharge plane of the hot gas stream and the cold gas stream are essentially equal. Preferably this is attained by forming the walls 42, 44 radially of the axis of the duct 22, with the included angle between these walls decreasing toward the chute outlets. The progressive breakaways in FIG. 3 illustrate the cross section of the hot gas stream as progressively transformed to an annular segment outline wherein there is a greater mass flow in the outer portions of the chutes than at the inner portions.

A further factor in minimizing losses of the fluid streams flowing through the mixer is found in the fact that the hot gas stream chutes 34 provide a nozzle effect, that is, they have a larger area at their inlets than at their outlets and, therefore, accelerate the stream cowing therethrough into the discharge plane. FIGS. 2 and 4–7, in combination with the breakaways of FIG. 3, illustrate the nozzle effect described above which provides an acceleration of the hot gas stream through the chutes 34 to thereby minimize losses as the hot gas stream passes through the mixer.

Similar features are provided in the fan stream chutes 36 by the present mixer. The lobed walls are able to define both hot gas stream and fan stream chutes by a thin-walled construction having essentially uniform wall thickness. The diameter of the nacelle 18 is decreased as it passes between the lobes 33. The dimension is controlled so that there is a decrease in the areas of the fan stream chutes from their inlets to their outlets. Simultaneously the two gas streams are brought to a mixing zone or plenum having a sufficient cross sectional area. Further, there is a very substantial linear length to the gas streams as they enter the mixing zone. The referenced linear length is represented by the discharge outlines of the chutes 34 and 36 where the two gas streams join. This feature contributes to effective mixing action and reduces the amount of noise generated by this process.

Further contributing to minimization of losses is the fact that the outer panel 40 of the lobes 53 are faired as they angle into the hot gas stream and only their outer end portions, which esentially are parallel to the fan stream flow path, have relatively sharp corners joining the side walls 42, 44. Since the outer lobed walls 40 are maintained at a maximum width to provide a maximum mass flow of the hot gas stream at the outer portions thereof in the discharge plane and because of the decreasing included angle between the side walls 42, 44, there is a resultant tear-shaped configuration, as seen in FIGS. 4–7, which is more extreme due to the decrease in the diameter of the nacelle 18. This configuration is effective in efficiently guiding the fan stream to a reduced diameter, requisite for transition of the fan stream to the necessary diameter of the discharge nozzle 32.

Another factor contributing to minimization of losses in the mixer is found in the configuration of the fan stream duct. For efficient fan operation, a nozzle throat is formed in this fan duct approximately at 45 so that a relatively high velocity may be maintained during the major portion of the stream's travel down the duct 22. Immediately upstream of the mixer 30 the area of the duct 22 is increased in a diffuser section 47 to thus decrease the fan stream velocity as it first enters the mixer. By having a lower velocity when there is an initial change in the fan stream flow path through the mixer and then accelerating the fan stream as it flows through the mixer, an optimum condition is established for minimizing flow losses.

A further factor to be noted in connection with the mixer is that the relative changes in areas of the hot gas stream chutes and fan stream chutes 36 also provide approximately equal Mich, numbers for the two streams as they are discharged into the exit plane. This provides an effective mixing action in a minimum axial length, and, again, with a minimum of losses.

The above-described features, minimizing losses in the mixer, enable greater attainment of the potential efficiency of a mixed flow turbofan engine cycle and are of particular benefit when used to obtain sound reduction in the manner now to be described.

Referencing FIG. 2, it will be seen that the rotor of the fan turbine 14 is compositely formed and includes a rear shaft portion 91 which is journaled by a bearing 93. The bearing 93 is supported by a frame member 95 connected to the inner surface of the mixer 30. The mixer comprises a ring member 97 which is secured to the outer casing 99 of the fan turbine. The outer casing in turn is secured to a frame member 101 which also defines the annular duct 61.

The mixer 30 thus functions to transmit bearing loads from the bearing 93, through the frame member 95, upwardly primarily through the juncture of adjacent walls 42, 44 and the ring 97, into the turbine casing 99, and then to the structural frame member 101. The mixer structure, as described, thereby eliminates the need for a separate frame element to carry the bearing loads of the aft turbine bearing into the main structural components of the engine.

Figure 5:
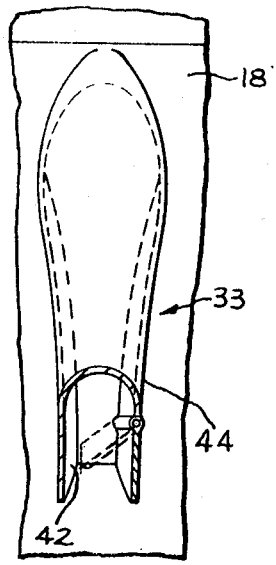
FIG. 5 is a section taken on line V—V in FIG. 2.
Figure 6:
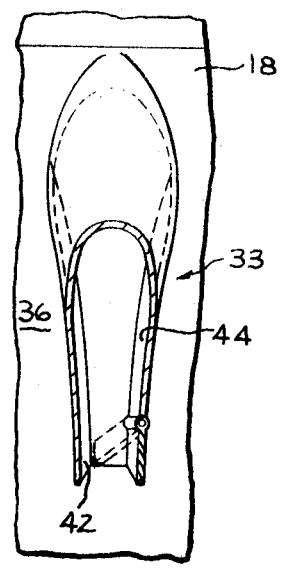
FIG. 6 is a section taken on line VI—VI in FIG. 2.
Figure 7:
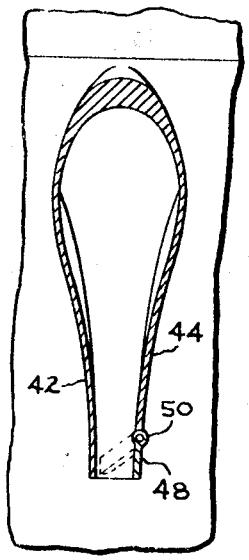
FIG. 7 is a section taken on line VII—VII in FIG. 2.

The means for reducing the engine noise generated by the fan 16 include means for reducing the discharge area of the hot gas stream chutes 34. Preferably a flapper valve 48 forms the downstream portion of each chute wall 44 (FIGS. 2, 3, and 5). The flapper valves 48 are mounted on pins 50 which extend within the chute walls 38 into a cavity, further defined by the plug-like termination of the nacelle 18. Levers 52 are secured to the inner ends of each pin 50 and are connected to a unison ring 54. An actuator 56 may be connected to the unison ring 54 through a bell crank 59 and selectively displaced to simultaneously swing the flapper valves 48 from their open, full line positions, as illustrated in FIGS. 3, 5, and 6, to their closed, dotted positions in which the discharge area of the hot gas stream chutes is substantially reduced. The actuator may be pneumatically powered by pressurized air supplied through tubes 57.

When this occurs, the pressure drop across the fan turbine 14 is decreased and there is a marked reduction in the rate of rotation of the fan motor. The net result is that there is a reduction in the energy level of the fan stream. Consequently the hot gas stream provides a greater proportion of energy to the mixed stream which is discharged through the nozzle 32.

Under most operating conditions it will be desirable to increase the energy level of the hot gas stream when the fan stream is reduced in order to maintain the desired propulsive thrust. This may be attained by increasing the rate of fuel flow to the core engine compressor 26, as is discussed in greater detail in the above-referenced application.

In any event, reduction of the discharge area of the hot gas stream chutes 34 and increases in the rate of fuel flow to the combustor 26 tend to increase the back pressure on the core engine compressor 24. To prevent aerodynamic overloading and stall of the core engine compressor 24, means are provided for diverting or bleeding a portion of the hot gas stream into the fan duct from a point intermediate the core engine turbine 28 and the fan turbine 14. To this end a plurality of passageways 60 extend from the hot gas stream duct 61 into the fan duct 22. Preferably these passageways extend longitudinally and enter the duct 22 at a low angle with their outlets aligned with the fan stream chutes of the mixer (FIG. 3).

Poppet valves may be provided to selectively control flow through the passageways 60. The poppet valves 62 may be pneumatically operated and are shown with tube 64 connecting opposite ends of a cylinder 66 to an appropriate means for porting air to one side or another of a valve piston 68 to open the valves or close them, as desired.

Figure 9:
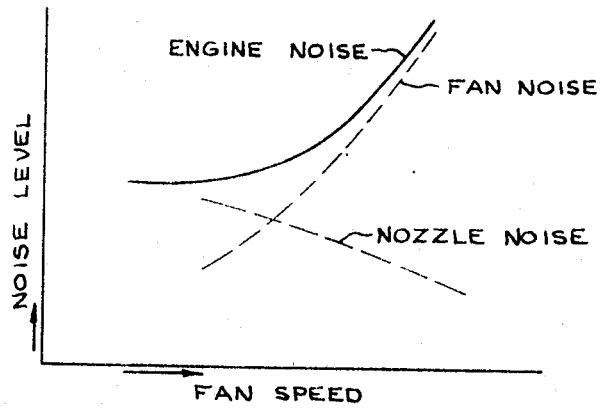
FIG. 9 is a plot of the relative noise levels generated by the fan in the propulsive system of the present engine.

When the valves 62 are opened during sound reduction operations, several advantages are obtained beyond reducing the aerodynamic loading on the core engine compressor 24. With the valves 62 open, the pressure drop across the fan turbine 14 is further decreased, thereby obtaining further reductions in the rate of rotation of the fan rotor and a consequent reduction in fan noise. Additionally the turbine inlet temperature is reduced. The portion of the hot gas stream diverted into the fan duct is retained in the propulsive system and mixes with the fan stream prior to entering the mixer 30. One of the significant factors of the above-referenced application is that fan noise is substantially reduced without any increase in the overall engine noise. This is to say that as fan noise is reduced, the noise generated by discharge of the mixed gas stream from the nozzle 32 tends to become a predominant factor. FIG. 9 illustrates that the increase in noise from the nozzle 32 is at a relatively low rate compared to the decrease in noise of the fan 16, thereby obtaining the desired reduction in engine noise level.

Figure 10:
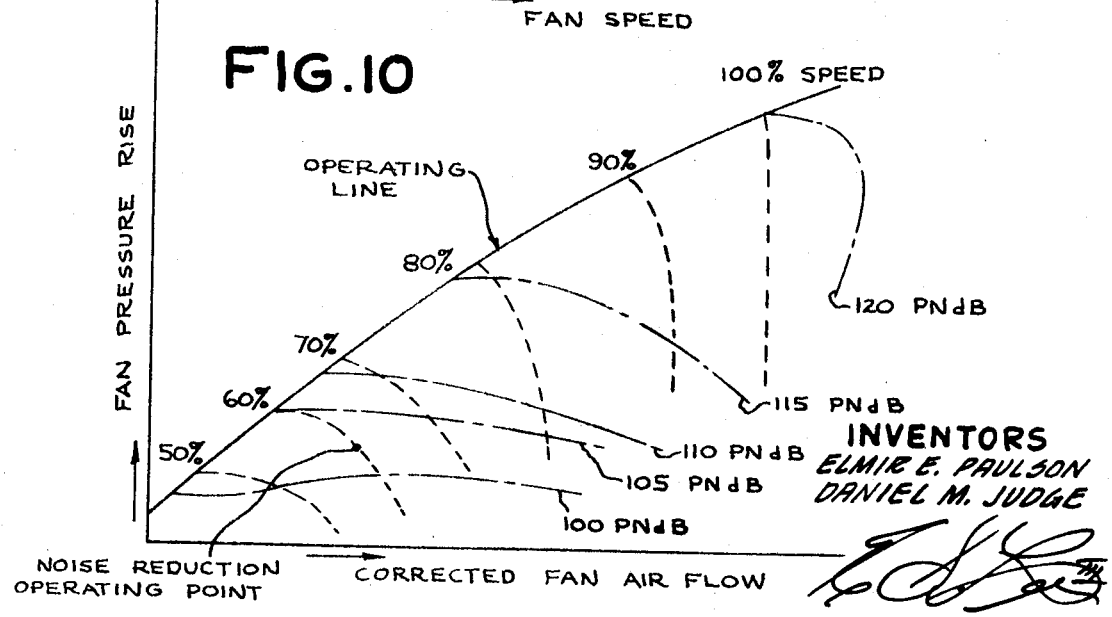
FIG. 10 is a plot of the operating characteristics of the gas turbine engine fan and their relation to noise.

FIG. 10 further illustrates some unobvious benefits in noise reduction as they are best presented on a "compressor map." It is common practice to plot certain operating characteristics of compressors (a fan is a low pressure compressor) as they relate to corrected air flow through the compressor and the pressure rise across the compressor. FIG. 10 is a representative compressor map for a low pressure compressor or fan generally of the type shown in FIG. 1. In normal operation or design operation, the pressure rise and corrected air flow for any given rotor speed are maintained at an operating line which provides a margin of safety so that there will be no aerodynamic overloading of the compressor or fan with resultant staff conditions. From this compressor map it will be apparent that when the fan rotor speed is dropped, there will be less pressure rise and less corrected air flow. It is contemplated that the fan rotor speed can be dropped to 60% as an illustrative value. This, it will be seen, provides a significant reduction in noise level as represented by the plots of perceived noise level (PNdB) also found in FIG. 10. However, further advantages are attained in noise reduction in that the increase in the proportion of hot gas flow to fan flow through the mixer provides an aspirator or pumping effect which increases mass flow through the fan. Thus, if the fan speed is reduced to 60%, the operating point under a noise reduction mode of operation would be below the operating line and the improvements in sound reduction are, therefore, greater than simply reducing fan speed to 60% and maintaining its operating point, i.e., pressure rise and corrected air flow, on the operating line.

The described propulsion system also has unobvious benefits in thrust reverse operation, more fully described in the above-referenced application and involving the use of one or more cascades of deflector vanes 100 provided in the cowls 20 upstream of the mixer 30. In normal operation these cascades are covered by panels 102. When reverse thrust is desired, an actuator or plurality of actuators 104 are displaced and through appropriate linkage connections swing the panels 102 into the fan duct (see the dotted line position in FIG. 2). The panels 102 which are preferably provided around the inner circumference of the cowl 20 provide a blocker, which then diverts the fan air stream through the cascades 100 to provide the desired reverse thrust for the engine.

Various modifications of the described mixer structure will occur to those skilled in the art and may be made without departing from the fundamental theme of the invention.

Having thus described the invention, what is claimed as novel and desired to be secured by Letters Patent of the United States is:

1. A structure for receiving a first gas stream from an inner duct and a second gas stream from a generally annular duct surrounding said first duct and for discharging said streams into a common plenum so as to efficiently mix said gas streams, said structure comprising a plurality of lobes projecting from said inner duct into said anular duct, the outer walls of said lobes being angled in the direction of gas flow through said ducts, said ducts defining alternate chutes through which the two gas streams pass, for discharge into said common plenum, said lobes comprising side walls, formed generally radially of the axis of said annular duct, with a decreasing included angle from the inlets to the outlets of first gas stream chutes, each said chute having a greater area at its inlet than at its outlet whereby the streams are accelerated as they pass through said chutes.

2. A mixer as in claim 1 wherein the outer walls of said lobes are spaced from the outer boundary of said outer annular duct to provide continuous flow of said second gas stream over said lobes.

3. A mixer as in claim 1 wherein one side wall of each lobe is formed, in part, by a flapper valve pivotal about an axis generally radial of the axis of said annular duct and spaced upstream from the chute outlets, and means for pivoting said flapper valves, respectively, toward the other of said lobe side walls to thereby decrease the exit areas of the first gas stream chutes.

4. A mixer as in claim 3 wherein an internal cavity is defined within the downstream portions of said lobes, with said flapper valve pivoting means comprising rods on which the flapper valves are mounted, said rods extending into said internal cavity, a lever secured to each rod end within said cavity, a unison ring to which said levers are connected, and means for oscillating said unison ring.

5. A mixer as in claim 1 wherein,
said lobes have inner walls extending between their side walls and defining the inner bounds of the first gas stream chutes and
the inner wall of said annular duct extends between said lobes and is angled from the upstream ends of the top walls of the holes to the downstream inner ends of said side walls and inner chute walls.

6. A turbofan engine comprising,
a core engine for generating a hot gas stream,
a fan turbine downstream of said core engine and driven by said hot gas stream,
a fan rotor driven said fan turbine,
a nacelle, within which said core engine and said turbine are housed,
an outer casing surrounding said fan rotor and extending downstream of said fan turbine and terminating in a nozzle,
said outer casing and nacelle forming an annular duct through which an air stream, pressurized by the fan rotor, passes,
a mixer downstream of sand fan turbine comprising a plurality of lobes projecting from said nacelle into said fan duct, said lobes defining alternate chutes through which the hot gas stream and fan stream respectively pass for mixing prior to discharge from said nozzle,
said lobes comprising side walls formed generally radially of the axis of said annular duct, one side wall of each lobe being formed by a flapper valve,
means for pivoting the flapper valves respectively towards the other of said lobe side walls about generally radial axes, spaced upstream from the chute outlets, to thereby decrease the exit areas of the hot gas stream chutes.

7. A turbine engine comprising
a core engine for generating a hot gas stream, said core engine including primary structure means for carrying bearing loads, a fan turbine downstream of said core engine and driven by said hot gas stream, said fan turbine comprising a turbine rotor and casing, said casing secured to said primary structure means,
a fan rotor driven by said fan turbine,
a nacelle, within which said core engine and said fan turbine are housed,
an outer casing surrounding said fan rotor and extending downstream of said fan turbine and terminating in a nozzle,
said outer casing and nacelle forming an annular duct through which an air stream, pressurized by the fan rotor, passes,
a mixer downstream of said fan turbine comprising a plurality of lobes projecting from said nacelle into said fan duct, said lobes defining alternate chutes through which the hot gas stream and fan stream respectively pass for mixing prior to discharge from said nozzle and terminating in spaced relationship to said outer casing,
said lobes having side walls which are joined at their upstream ends to divide the hot gas stream discharged from said fan turbine into alternate ones of said chutes,
bearing means for journaling said fan turbine rotor,
frame means, connected to the inner surface of said mixer adjacent the upstream ends of said lobes for supporting said bearing means, and
means for connecting said mixer to said turbine casing whereby loadings on said bearing means are transmitted to said primary structure means.

References Cited

UNITED STATES PATENTS

| | | | |
|---|---|---|---|
| 2,934,895 | 5/1960 | Gregory | 60—244 |
| 2,504,181 | 4/1950 | Constant | 60—262 |
| 2,978,865 | 4/1961 | Pierce | 60—262 |
| 3,048,376 | 8/1962 | Howald | 60—262 |
| 3,060,680 | 10/1962 | Wilde | 60—262 |
| 3,377,804 | 4/1968 | Wright | 60—262 |
| 3,385,064 | 5/1968 | Wilde | 60—262 |
| 3,434,288 | 3/1969 | Petrie | 60—226 |

MARK M. NEWMAN, Primary Examiner

D. HART, Assistant Examiner

U.S. Cl. X.R.

137—605; 259—4

UNITED STATES PATENT OFFICE
CERTIFICATE OF CORRECTION

Patent No. 3,514,955      Dated June 2, 1970

Inventor(s) E. E. Paulson et al

It is certified that error appears in the above-identified patent and that said Letters Patent are hereby corrected as shown below:

Column 7, line 18, delete the word "holes" and insert --lobes-- in place thereof; and Column 7, line 33, delete the word "sand" and insert --said-- in place thereof.

SIGNED AND SEALED
OCT 13 1970

(SEAL)
Attest:

Edward M. Fletcher, Jr.
Attesting Officer

WILLIAM E. SCHUYLER, JR.
Commissioner of Patents